US006830599B1

(12) United States Patent
McCutchen

(10) Patent No.: US 6,830,599 B1
(45) Date of Patent: Dec. 14, 2004

(54) BACK-FLOW VALVE AND TRIGGER FOR CLEANING MACHINE

(75) Inventor: Clinton J. McCutchen, Sand Springs, OK (US)

(73) Assignee: Christy, Inc., Sand Springs, OK (US)

( * ) Notice: Subject to any disclaimer, the term of this patent is extended or adjusted under 35 U.S.C. 154(b) by 0 days.

(21) Appl. No.: 10/016,353

(22) Filed: Dec. 10, 2001

(51) Int. Cl.$^7$ ............................................. B01D 46/00
(52) U.S. Cl. ............................ 55/283; 55/284; 55/287; 55/288; 55/302; 55/385.1; 55/484; 55/DIG. 3; 95/279; 96/425; 96/426; 96/427; 96/428; 15/352
(58) Field of Search .......................... 55/283, 284, 287, 55/288, 302, 385.1, 484, DIG. 3; 95/278, 279, 280; 96/425, 426, 427, 428; 15/352

(56) References Cited

U.S. PATENT DOCUMENTS

| | | | | | |
|---|---|---|---|---|---|
| 1,153,751 A | * | 9/1915 | Beth | ............................. | 55/288 |
| 1,784,339 A | * | 12/1930 | Clasen et al. | .................. | 55/288 |
| 2,576,656 A | * | 11/1951 | Wallin | ........................... | 55/287 |
| 2,980,207 A | * | 4/1961 | Allen | ............................ | 55/283 |
| 3,589,520 A | * | 6/1971 | Thorne | .......................... | 55/288 |
| 4,329,161 A | * | 5/1982 | Osborn | .......................... | 95/280 |
| 4,465,497 A | * | 8/1984 | Howeth | ......................... | 96/427 |
| 4,618,352 A | * | 10/1986 | Nelson | .......................... | 55/287 |
| 6,010,547 A | * | 1/2000 | Jeong et al. | ................... | 55/287 |
| 6,458,178 B1 | * | 10/2002 | Dietz et al. | .................... | 55/302 |
| 2003/0041729 A1 | * | 3/2003 | Finigan | ........................ | 95/280 |

* cited by examiner

*Primary Examiner*—Duane Smith
*Assistant Examiner*—Jason M. Greene
(74) *Attorney, Agent, or Firm*—Frank J. Catalano

(57) ABSTRACT

A valve and trigger cyclically connect a vacuum and a blower to a filter. The valve box has three openings, the first connectable to the vacuum, the second connectable to the blower and the third connectable to the filter. A gate inside the box, biased by the blower and the vacuum toward closing the first opening, is held against the bias by a trigger outside the box to close the second opening. The external trigger intervally operates to release the interior gate to close the first opening and open the second opening. The blower operates only if the trigger is operating. The gate is released once for approximately $\frac{1}{12}$ of a cycle interval during each trigger operating interval. A plurality of valves can be combined in a system with one trigger for cyclically sequentially connecting a plurality of filters to the vacuum and the blower.

14 Claims, 6 Drawing Sheets

BACK-FLOW VALVE AND TRIGGER FOR CLEANING MACHINE

BACKGROUND OF THE INVENTION

This invention relates generally to vacuum type cleaning machines and more particularly concerns back-flow valves and valve triggers facilitating cyclical washing of the cleaning machine filters.

Back flow valves typically employ gates which are directly mechanically or electrically driven. Consequently, the speed of movement of the gate is governed throughout its range of motion. The result is a response time that is detrimental to the smooth operation of the machine, the filtering action being blocked for unnecessarily long intervals because of the slow response of the back-flow valve. Furthermore, these mechanical and electronic systems are extremely complex and expensive and available only on the most expensive cleaning machines. For lower priced equipment, down time for filter replacement or cleaning is required.

In one valve system disclosed in U.S. Pat. No. 4,618,352 to Nelson, cams within the system air ducts rotate in direct physical contact with their valve gates, holding the gates in horizontal planes until notches in the cams allow them to rotate into diagonal planes. This system has serious power and efficiency problems. First of all, the cams are disposed on a common shaft. The common shaft arrangement of the cams requires side-by-side alignment of the system ducts transverse to the common shaft. This adds to duct length and imposes location requirements which increase system losses and structural complexity. Second, the notches are angularly displaced on the cams to synchronize the operation of the gates. Since the gates are in direct contact with the cams, the notches must be relatively wide in order for the gates to open for a sufficient interval. This imposes limitations on the blower to vacuum time ratios which greatly reduce the efficiency of the system. Third, in the horizontal condition the gates completely seal the openings to the blower ducts. However, in the diagonal condition only the free ends of the gates engage the vacuum ducts, so that there is no seal and air loss occurs. Fourth, since the cam notches receive the gates, the cam diameters must be greater than the ducts the gates close. Consequently, for the gates and cams to maintain physical contact, the ducts must be slotted to receive the cams. Therefore, special housings are required to prevent further air losses in the system. Fifth, the cams are constantly driven so that the back-flow cycle occurs throughout the cleaning process, reducing the normal operating efficiency of the system. Sixth, because there is no seal during the vacuum process, the speed of operation of the gate is left essentially to an initial push by the blower and the force of gravity rather than taking advantage of the vacuum to help slam the gate home. Seventh, the blower and the vacuum share a common shaft, so the blower is operating unnecessarily throughout the vacuum process. The composite result of these individual problems is that the system is ineffective for cleaning at any appreciable distance from the machine.

It is, therefore, an object of this invention to provide a back-flow valve and valve trigger which facilitate cyclical washing of the cleaning machine filters. Another object of this invention is to provide a back-flow valve and valve trigger which have a rapid response time so as to limit the duration of the back flow interval. A further object of this invention is to provide a back-flow valve and valve trigger using a gate which is air-flow biased by both a blower and a vacuum source toward a back-flow condition. Yet another object of this invention is to provide a back-flow valve and valve trigger using a gate which is not mechanically controlled during its transition from normal operation to back-flow operation. It is also an object of this invention to provide a back-flow valve and valve trigger using a gate which is not electrically controlled during its transition from normal operation to a back-flow operation. Still another object of this invention is to provide a back-flow valve and valve trigger using a gate which is not governed during its transition from normal operation to back-flow operation. Another object of this invention is to provide a back-flow valve and valve trigger which do not unnecessarily increase the length of the internal duct system. Another object of this invention is to provide a back-flow valve and valve trigger which eliminate openings and gaps which would cause pressure losses in the system. Still another object of this invention is to provide a back-flow valve and valve trigger in which an external valve trigger controls an internal valve gate. Still another object of this invention is to provide a back-flow valve and valve trigger which provide a relatively short back-flow interval during each filter cycle. Another object of this invention is to provide a back-flow valve and valve trigger which require only intermittent use of the back-flow system during the normal vacuuming process. An additional object of this invention is to provide a back-flow valve and valve trigger which are relatively simple and inexpensive. And it is an object of this invention to provide a back-flow valve and valve trigger which require operation of the blower only during the back-flow process.

SUMMARY OF THE INVENTION

A valve and a valve trigger are provided which cyclically connect a vacuum and a blower to a filter. The valve has a box with three openings. The first opening is connectable to the vacuum. The second opening is connectable to the blower. The third opening is connectable to the filter. A gate within the box is adapted to be biased by the blower and the vacuum to close the first opening. The gate is held against the bias by the external trigger to close the second opening. The external trigger is intermittently operated and is adapted to intervally release the internal gate to the bias to close the first opening and open the second opening. The preferred gate is a flapper hinged for angular motion between the first and second openings. The preferred trigger is a rotating cam with a follower fixed to the flapper. The cam operation is controlled by a timer. As the cam perimeter remains engaged with the follower, the flapper is held against the bias to close the second opening. An irregularity in the perimeter of the cam intermittently disengages the cam from the follower and releases the flapper to the bias of the air flow, allowing the flapper to slam against and close the first opening and open the second opening. The blower is energized in response to the timer so that it operates only when the cam is rotating.

A plurality of valves can be combined with a single trigger in a system for cyclically connecting a plurality of filters to the vacuum and the blower. In the preferred system, a plurality of cam followers are equally angularly displaced along the perimeter of a circular cam. The cam irregularity is shaped to release each gate for approximately $\frac{1}{12}$ rotation of the cam and intervally releases the gates to the bias to sequentially close their first openings.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
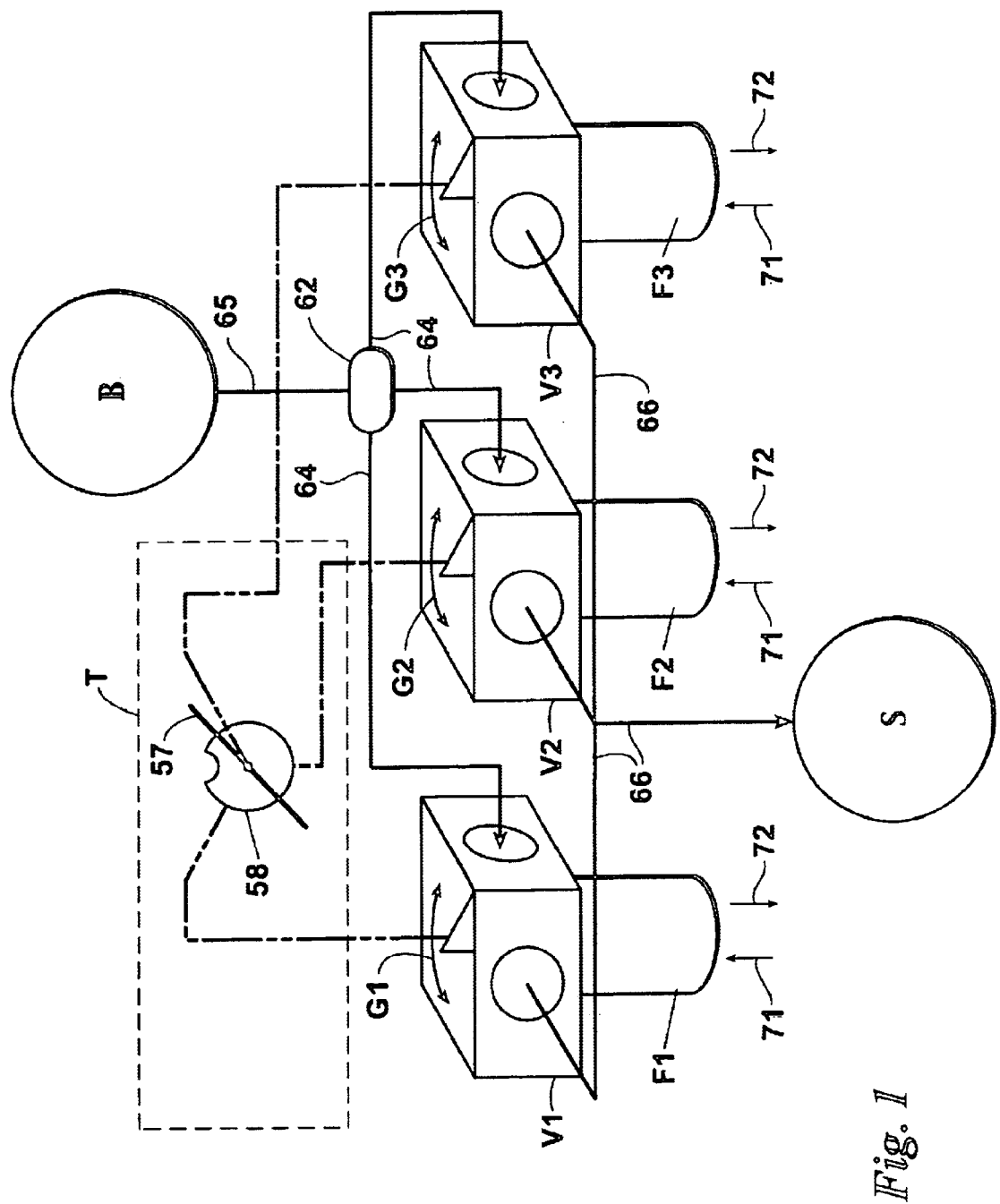
FIG. 1 is a mechanical schematic drawing of a three filter cleaning machine employing three back-flow valves and a single valve trigger.

Turning first to FIG. 1, a three-filter cleaning machine employing three back-flow valves and a single valve trigger is illustrated. During normal operation, a vacuum source S connected through valve V1, V2 or V3 pulls air contaminated with undesirable particles into three filters F1, F2 and F3 which remove the undesirable particles. While most of the accumulated particles are discharged into a filter pan, some of the particles amass on and clog the filter walls, diminishing the efficiency of the system. For back-flow operation, a blower B is connected to push air through the valves V1, V2 and V3 to their respective filters F1, F2 and F3 to dislodge the clogging particles from the filter walls. Each of the valves V1, V2 and V3 has a gate G1, G2 and G3, respectively, which seals off flow from the blower B into the valves V1, V2 or V3 and permits the vacuum source S to draw contaminated air into the filters F1, F2 and F3 during the normal vacuuming process. The gates G1 and G2 and G3 are mechanically held in place against the bias created by the blower B and the vacuum source S during the normal vacuuming process by a trigger T. The trigger T cyclically sequentially releases the gates G1, G2 and G3 to the bias of the blower B and the vacuum source S to cause them to seal off the suction of the vacuum source S and allow air pushed by the blower B to blast into the filters F1, F2 and F3. The trigger T is external to the valves V1, V2 and V3. In switching to the back-flow process, the trigger T completely disengages mechanical connection to the gates G1, G2 and G3 so that the bias afforded by the blower B and vacuum source S causes the gates G1, G2 and G3 to rapidly slam from the vacuum to the back-flow condition.

Figure 2:
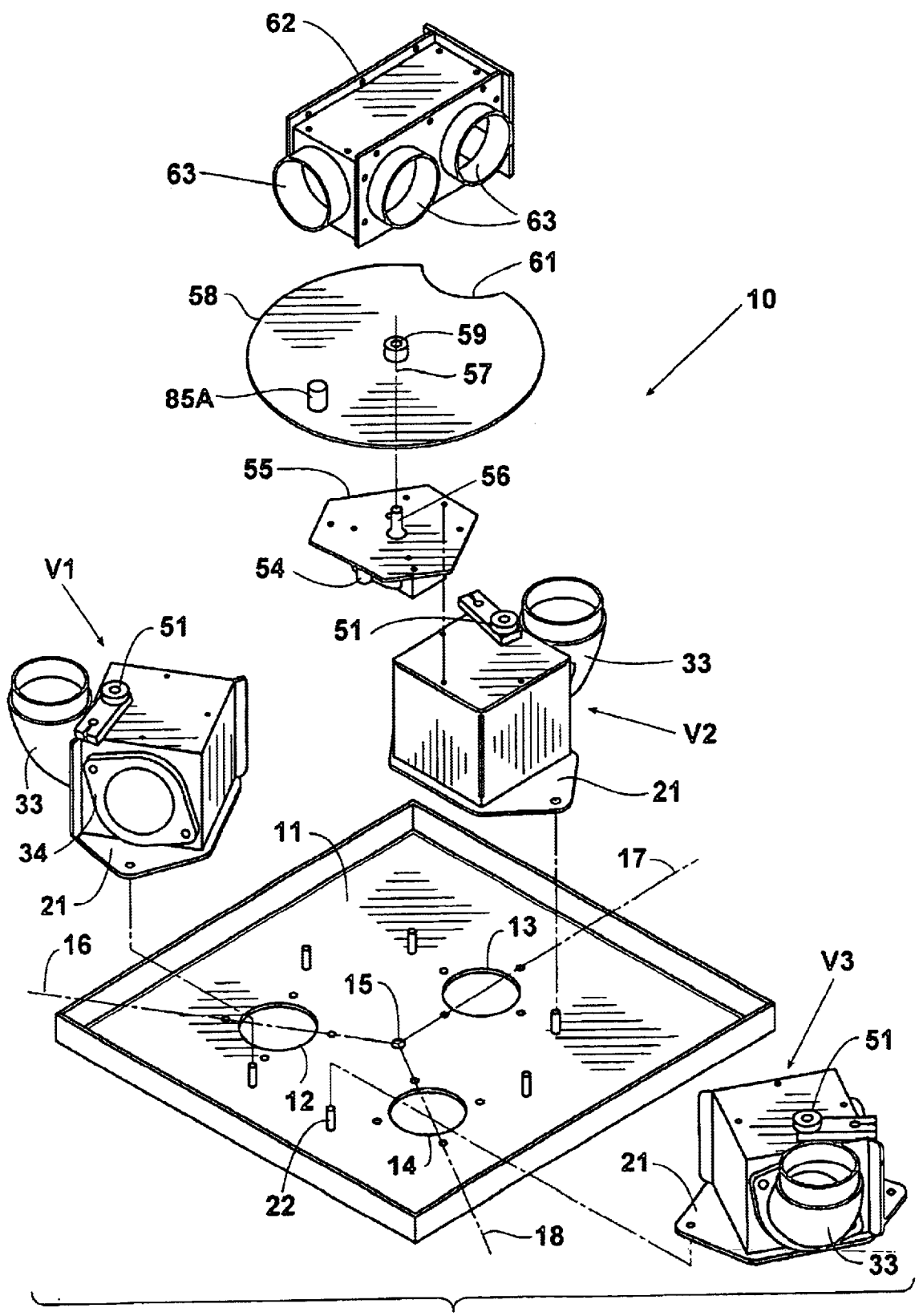
FIG. 2 is a perspective assembly view of the back-flow valves and valve trigger of FIG. 1.
Figure 3:
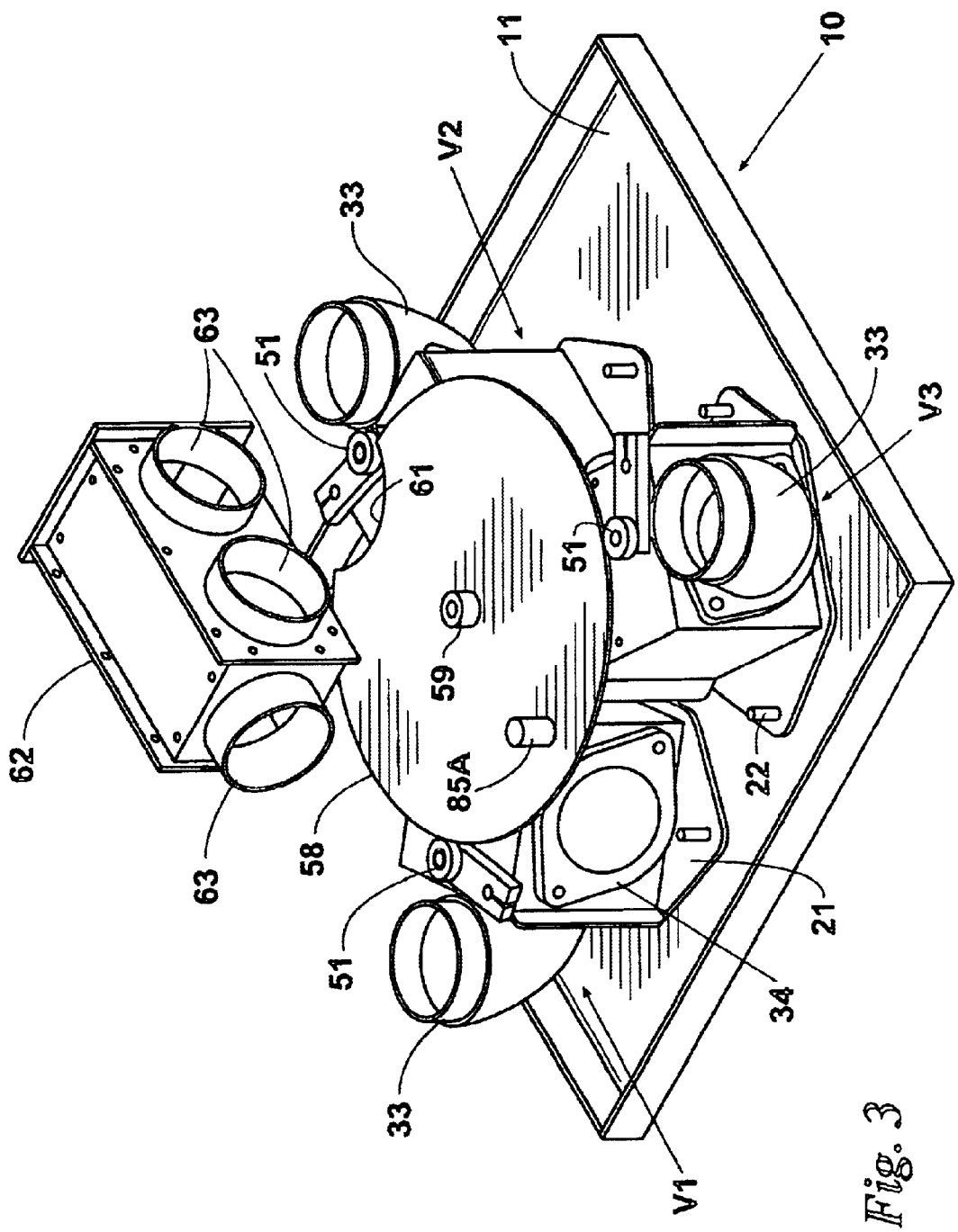
FIG. 3 is a perspective view of the assembled back-flow valve and valve trigger of FIG. 1.

Looking now at FIGS. 2 and 3, the valve deck 10 is illustrated in greater detail. Valves V1 V2 and V3 are mounted on a base 11. For the three-filter machine illustrated, the base 11 has three passages 12, 13 and 14 which are equidistantly spaced from a center point 15 on axes 16, 17 and 18 and are equally angularly displaced from each other. The filters F1, F2 and F3 are mounted below the plate 11 and aligned with the passages 12, 13 and 14, respectively, as best seen in FIG. 1. The valves V1, V2 and V3 are secured to the top face of the base 11 by mounting plates 21 which receive bolts 22 extending upwardly from the base 11.

Figure 4:
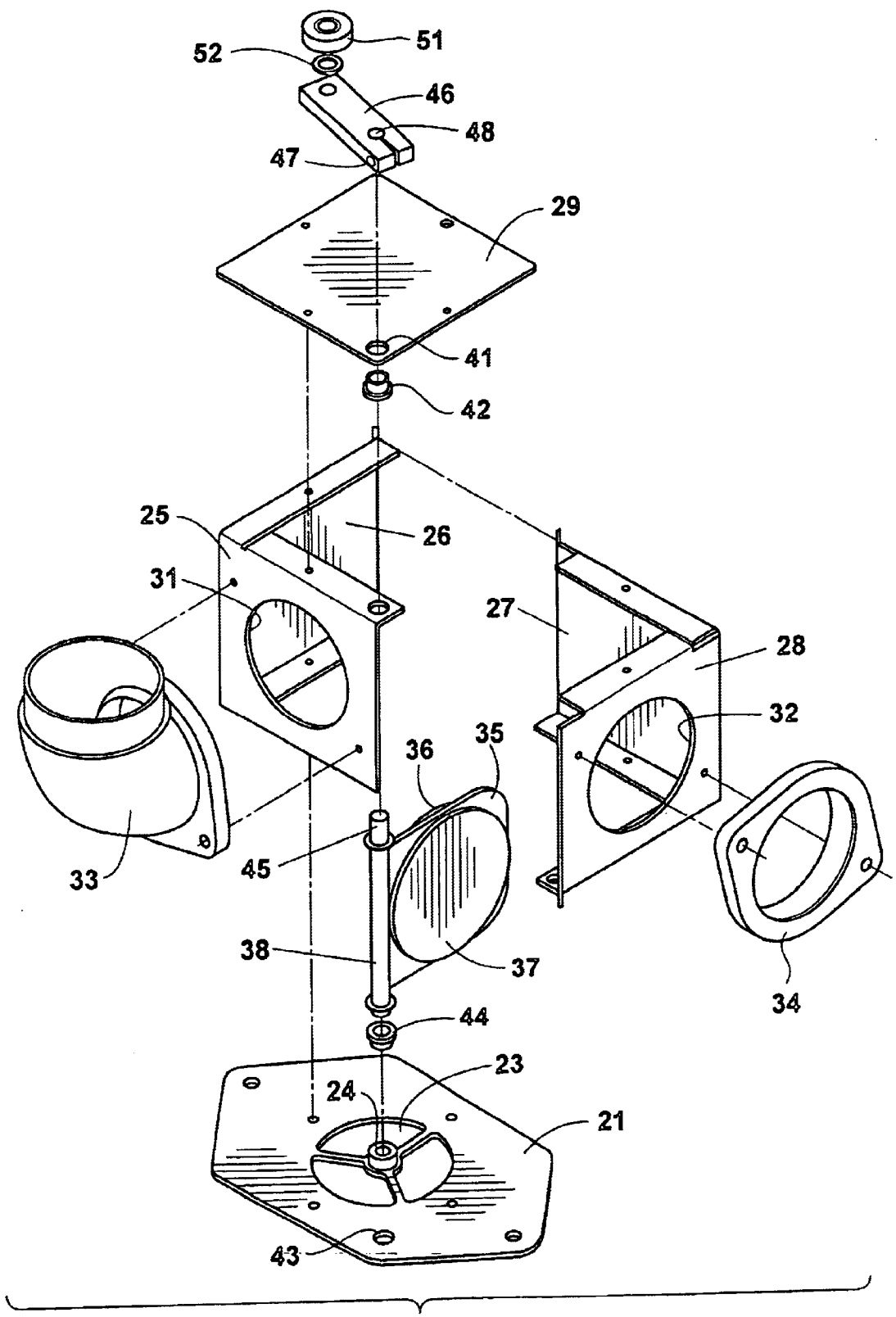
FIG. 4 is a perspective assembly view of a preferred embodiment of the valves of FIG. 1.
Figure 5:
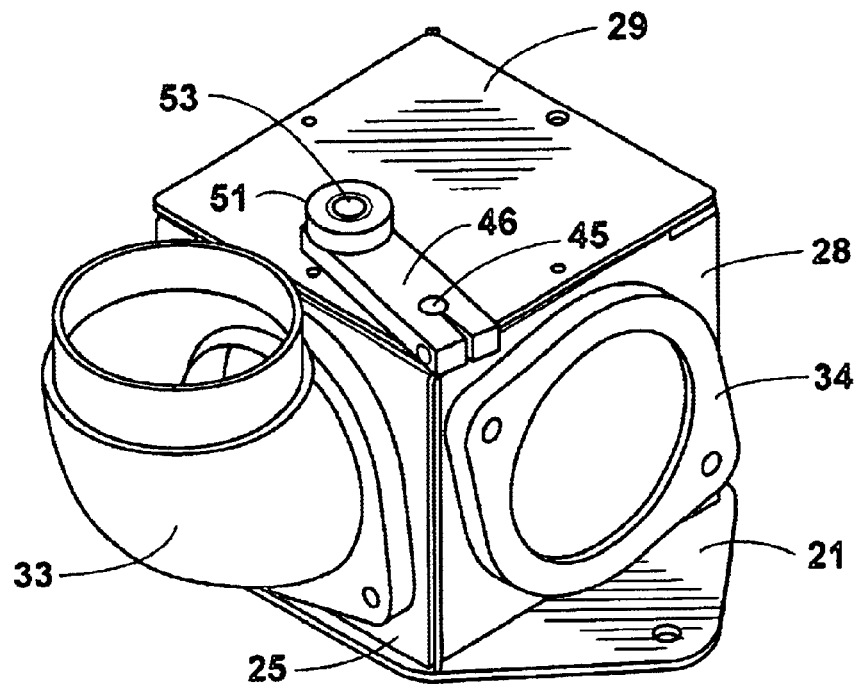
FIG. 5 is a top perspective view of the assembled valve of FIG. 4.
Figure 6:
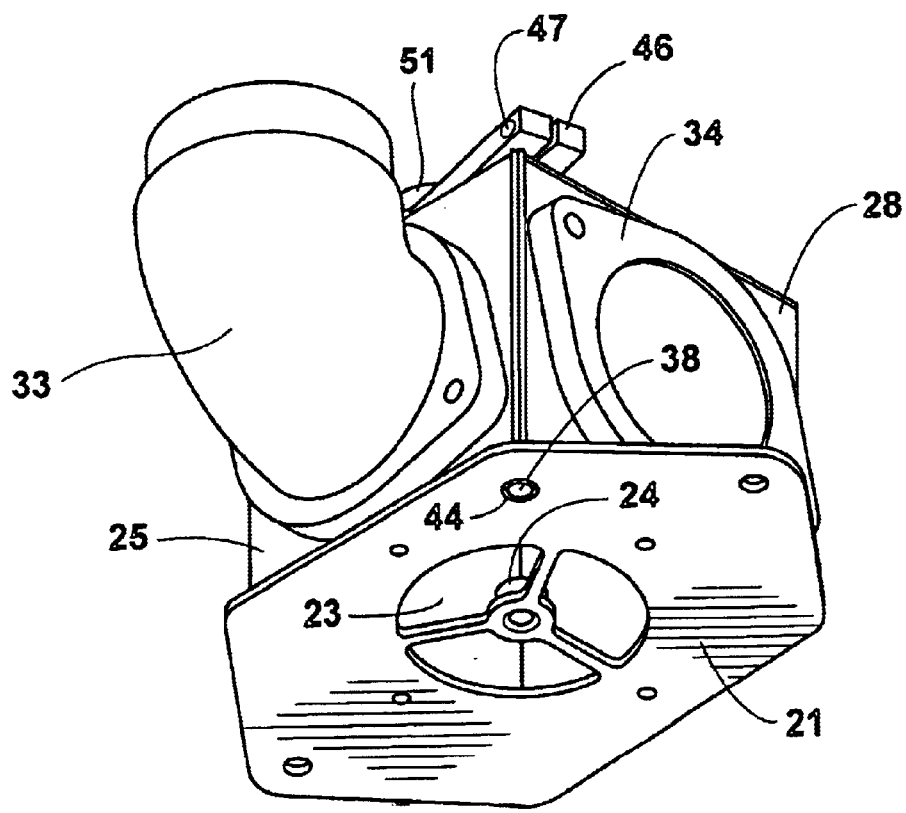
FIG. 6 is a bottom perspective view of the assembled valve of FIG. 4.

The valves V1, V2 and V3 are illustrated in greater detail in FIGS. 4–6. The mounting plates 21 have openings 23 which align with the passages 12, 13 and 14 through the base 11. A hub 24 at the center of each opening 23 allows the filter F1, F2 or F3 to be engaged beneath its respective opening 23. Each of the valves V1, V2 and V3 has sidewalls 25, 26, 27 and 28 and a cover 29 which, in cooperation with the mounting plate 21, defines the valve box. Two of the walls 25 and 28 have ports 31 and 32. Adapters 33 and 34, respectively, are secured at the ports 31 and 32 to facilitate connection of system ducts, seen in FIG. 1, to the valve box. As shown, the ports 31 and 32 are in adjacent orthogonal sidewalls 25 and 28. A clapper 35, such as an approximately square sheet of metal stock, has circular disks 36 and 37 of compressible material attached to its opposite faces. The adapters 33 and 34 have circumferences within the valve boxes to provide a suitable sealing surface and the disks 36 and 37 are sized and textured to cooperate with the adapters 33 and 34 to seal the passages 31 and 32. One edge of the clapper 35 abuts and is fixed to a shaft 38 which extends above and below the upper and lower edges of the clapper 35. A brass bushing 42 is fitted into an aperture 41 in the corner of the cover 29 at the junction point of the sidewalls 25 and 28. Another brass bushing 44 is fitted into another aperture 43 in the mounting plate 21 which is vertically aligned with the aperture 41 in the cover 29. The upper and lower ends of the flapper shaft 38 are journaled for rotation in the bushings 42 and 44 so that the flapper 35 can rotate between a first position in which one of the disks 36 seals one of the ports 31 and a second position in which the other of the disks 37 seals the other of the ports 32. The upper end 45 of the shaft 38 further extends through its bushing 42 upwardly beyond the top of the cover 29 for engagement with one end of a follower arm 46. The arm 46 is secured proximate one of its ends to the top end of the shaft 45. A threaded screw 47 through a split in the arm 46 tightens the aperture 48 into which the end 45 of the shaft is inserted. The arm 46 extends radially outwardly from the shaft 38 to a cam follower 51 which is journaled for rotation using a washer 52 on a post 53 extending upwardly from the arm 46. The seams of the valve box are sealed with a suitable duct sealant to insure the pneumatic integrity of the valves V1, V2 and V3.

Returning to FIGS. 2 and 3, a motor 54 is mounted beneath a motor mounting plate 55 with the shaft 56 of the motor 54 extending upwardly through the mounting plate 56. The bottom face of the motor mounting plate 56 is fastened to the top faces of the valve covers 29 with the axis 57 of the motor shaft 56 in vertical alignment through the center point 15 of the symmetrical arrangement of valves V1, V2 and V3. A circular cam 58 is concentrically mounted on the top of the motor shaft 56 by the cam hub 59. The diameter of the cam 58 is such that its circumference engages the cam followers 51 to hold the flapper disks 36 against the valve ports 31. This can be assured by adjustment of the angular position of the follower arms 46 in the gate shafts 38. An irregularity 61 in the circumference of the cam 58 completely disengages the cam 58 from mechanical contact with the follower 51 so that, when the follower 51 is released, its corresponding flapper 35 is free to rotate on its shaft 38 until the other disk 37 on the flapper 35 seals the other port 32 of its respective valve V1, V2 or V3. Looking at FIGS. 1, 2 and 3, a manifold 62 has outlets 63 connected by ducts 64 to their respective inlet ports 33 in the valves V1, V2 and V3. The blower B is connected by a duct 65 to the inlet of the manifold 62. Similarly, the vacuum source S is connected to the ports 32 of the valves V1, V2 and V3 by ducts 66.

Figure 7:
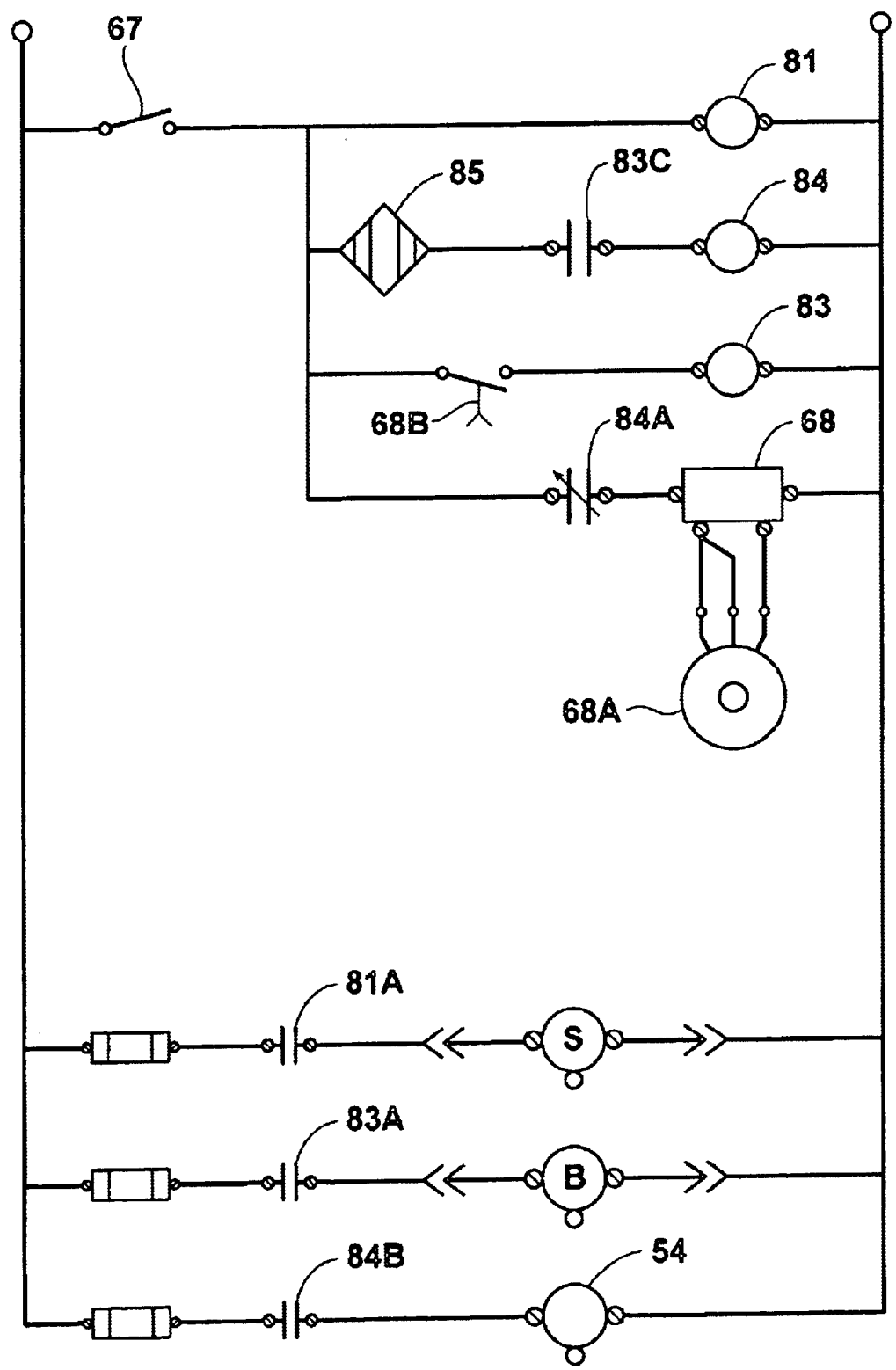
FIG. 7 is an electrical schematic drawing of the machine of FIG. 1.

Looking at FIGS. 1 and 7, the operation of the machine can be understood. The cam drive motor 54 is controlled through a switch 67 and time delay circuit 68 which are part of the trigger T. The cam 58 is normally engaged with the cam followers 51 so as to hold the flappers 35 with their disks 36 sealing the blower inlet ports 31 into the valves V1, V2 and V3. In this position, the suction of the vacuum source S and the pressure from the blower B, the former drawing against the vacuum side disks 37 and the latter pushing against the blower side disks 36, biases the flappers 35 to rotate from the blower inlet ports 31 toward the vacuum outlet ports 32. However, the flappers 35 are held against the bias by the mechanical engagement of the cam 58 with the followers 51. As the cam motor 54 rotates the cam 58, the irregularity 61 in the cam circumference sequentially releases the cam followers 51 completely from mechanical engagement so that the gates G1, G2 and G3 are free to rotate in response to the bias to open the blower inlet ports 31 and slam the vacuum outlet ports 32 closed. Thus, air is no longer drawn by the vacuum source S into the filter F1, F2 or F3 associated with the released gate G1, G2 or G3 in the forward flow direction 71 but air is blown into the filter F1, F2 or F3 in reverse-flow direction 72 to dislodge particles collected on the filter walls during the vacuuming process. The contour of the irregularity 61 of the cam 58 is selected so as to release each cam follower 51 from mechanical engagement for approximately $1/12$ of a rotation of the cam 58. Because of the rapid response of the mechanically released gates G1, G2 and G3, each filter F1, F2 and F3 experiences back flow for only $1/12$ of a cam rotation and the entire system is experiencing back flow for only $1/4$ of a cam rotation. Thus, even during the back flow process, the normal vacuum process continues at 100% effectiveness for $3/4$ of the cam rotation. Furthermore, the timer rheostat 68A can be adjusted by the machine operator to cause its switch 68A to operate at any desired interval, preferably in a range of from 1.5 to 30 minutes. When the switch 67 is closed, a first relay 81 is energized, closing its normally open contacts 81A to energize the vacuum source S. The timer 68 is energized simultaneously through normally closed contacts 84A. As long as the timer 68 is energized, it will cause its switch 68B to operate at the intervals set by the timer rheostat 68A. Assuming, for example, a selected interval of twenty minutes, the timer switch 6B will close twenty minutes after the switch 67 is turned "ON" and every twenty minutes thereafter. This will energize a second relay 83 which closes two of its normally open contacts 83A and 83B to engage the blower B and the cam motor 54, respectively, and third normally open contacts 83C in the circuit of a third relay 84. The third relay 84 controls the normally closed contacts 84A which control the timer 68. The energized cam motor 54 causes the cam 58 to rotate. A post 85A fixed to and rotating with the cam 58 activates a proximity switch 85 in the circuit of the third relay 84. The proximity switch is normally open. If the blower B and cam motor 54 are energized, the second relay contacts 83C are closed. When the proximity switch 85 closes, the third relay 84 opens the contacts 84A to de-energize the timer 68, opening the timer switch 68B and de-energizing the second relay 83 to shut off the blower B and cam motor 54 and reset the system which will repeat itself when the selected time interval of twenty minutes has elapsed. The proximity switch 85 is operated after one revolution of the cam 58. Therefore, each of the filters F1, F2 and F3 will receive one blast of blower air every twenty minutes and the blower B and cam motor 54 are energized for only one rotation of the cam 58 every twenty minutes. If, for example, the cam motor 64 drives the cam 58 at one (1) rpm, the back-flow process is in operation for only $1/20$ of the vacuuming process and each filter will sequentially receive one five second blast of blower air during the one minute back-flow interval. In this manner, the back-flow process can be used to eliminate down time to replace or clean filters without any significant reduction in the power and efficiency of the vacuum process, even while back-flow is occurring. While the invention has been described in relation to a three-valve system, any number of valves and filters can be used applying the principles of the invention.

Thus, it is apparent that there has been provided, in accordance with the invention, a back flow valve and valve trigger for a cleaning machine that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A valve for cyclically connecting a vacuum and a blower to a filter comprising a box having three openings therein, a first of said openings being connectable to the vacuum, a second of said openings being connectable to the blower and a third of said openings being connectable to the filter, a flapper hinged for angular motion within said box and adapted to be biased by the blower and the vacuum toward a first position in which said flapper closes said first opening and a rotating cam and a follower fixed to said flapper outside said box for holding said flapper against said bias in a second position in which said flapper closes said second opening, said cam and said follower being adapted to intervally release said flapper to said bias to close said first opening.

2. A valve according to claim 1, said holding means having an irregularity in a perimeter of said cam for internally releasing said gate.

3. A valve according to claim 2, further comprising means for intermittently activating rotation of said cam.

4. A valve according to claim 2 further comprising means for intermittently simultaneously activating rotation of said cam and operation of said blower.

5. A system for cyclically connecting a plurality of filters to a vacuum and a blower comprising a plurality of valves, each valve comprising a box having three openings therein, a first of said openings being connectable to the vacuum, a second of said openings being connectable to the blower and a third of said openings being connectable to one of the plurality of filters, and a clapper hinged for annular motion within said box and adapted to be biased by the blower and the vacuum toward a first position in which said flapper closes said first opening and a rotating cam and a plurality of followers, one follower fixed to each said flapper outside said box for holding each of said flappers against said bias in a second position in which each said flappers closes its said second opening, said cam and followers being adapted to intervally release said flappers to said bias to sequentially close said first openings.

6. A system according to claim 5, said holding means having an irregularity in a perimeter of said cam for intervally sequentially releasing said gates.

7. A system according to claim 6, said cam being circular.

8. A system according to claim 7, said followers being equally angularly displaced along a perimeter of said cam.

9. A system according to claim 8, said irregularity releasing each said gate for approximately 1/12 rotation of said cam.

10. A cleaning machine comprising:
   a plurality of filters;
   a vacuum;
   a blower;
   a plurality of valves, each valve comprising
      a box having three openings therein, a first of said openings being connectable to the vacuum, a second of said openings being connectable to the blower and a third of said openings being connectable to one of the plurality of filters, and
      a flapper hinged for angular motion within said box and biased by a pressure from the blower and a suction from the vacuum toward a first position in which said flapper closes said first opening; and
      a rotating cam and a plurality of followers, one follower fixed to each said flappers outside said box and holding each of said flapper against said bias in a second position in which each said flapper closes its said second opening, said cam and follower being adapted to intervally release said flappers to said bias to sequentially close said first openings.

11. A machine according to claim 10, said holding means having an irregularity in a perimeter of said cam for intervally sequentially releasing said gates.

12. A system according to claim 11, said cam being circular.

13. A system according to claim 12, said followers being equally angularly displaced along a perimeter of said cam.

14. A system according to claim 13, said irregularity releasing each said gate for approximately 1/12 rotation of said cam.

* * * * *